(12) United States Patent
Gunnalan et al.

(10) Patent No.: US 11,736,552 B1
(45) Date of Patent: Aug. 22, 2023

(54) SENDER BASED ADAPTIVE BIT RATE CONTROL (71) Applicant: Microsoft Technology Licensing, LLC, Redmond, WA (US)

(72) Inventors: Rajesh Gunnalan, Sammamish, WA (US); Ilja Tsahhirov, Bellevue, WA (US); Mihhail Konovalov, Kirkland, WA (US); Tin Qian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/949,869

(22) Filed: Sep. 21, 2022

(51) Int. Cl.
*H04L 65/80* (2022.01)
*H04L 65/752* (2022.01)

(52) U.S. Cl.
CPC .......... *H04L 65/752* (2022.05); *H04L 65/80* (2013.01)

(58) Field of Classification Search
CPC .............................. H04L 65/752; H04L 65/80
See application file for complete search history.

(56) References Cited

U.S. PATENT DOCUMENTS

| | | | | |
|---|---|---|---|---|
| 9,532,062 | B2* | 12/2016 | De Cicco | H04N 19/149 |
| 2010/0172278 | A1 | 7/2010 | Nishio et al. | |
| 2010/0172286 | A1 | 7/2010 | Yoshii et al. | |
| 2013/0262695 | A1* | 10/2013 | Friedrichsen | H04L 67/02 709/231 |
| 2015/0249689 | A1* | 9/2015 | Sparks | H04L 65/1104 370/236 |
| 2016/0036673 | A1* | 2/2016 | Meirosu | H04L 43/0852 370/252 |
| 2016/0350056 | A1 | 12/2016 | Makar et al. | |
| 2017/0041238 | A1* | 2/2017 | Do | H04N 21/8543 |
| 2017/0222936 | A1* | 8/2017 | Al-Roubaiey | H04L 47/24 |
| 2018/0084020 | A1* | 3/2018 | Li | H04L 65/762 |
| 2021/0209807 | A1 | 7/2021 | Oh | |
| 2022/0394073 | A1* | 12/2022 | Burke | H04L 43/0894 |

OTHER PUBLICATIONS

U.S. Appl. No. 17/670,148, filed Feb. 11, 2022.
"Reference Frame (video)", Retrieved From: https://en.wikipedia.org/w/index.php?title=Reference_frame_(video)&oldid=1024658073, May 23, 2021, 2 Pages.

(Continued)

*Primary Examiner* — Oanh Duong
(74) *Attorney, Agent, or Firm* — Klarquist Sparkman, LLP (57) ABSTRACT

Techniques are described for streaming (e.g., low-latency streaming) of media content by performing sender-based adaptive bit rate control operations. The operations can include streaming a media stream to a streaming client. While streaming the media stream, an outgoing queue of buffered streaming content to be sent to the streaming client can be monitored. When a step down condition is satisfied, based at least in part on the monitoring, a switch can be made to a lower bit rate media stream for streaming to the streaming client. When a step up condition is satisfied, based at least in part on the monitoring, a switch can be made to a higher bit rate media stream for streaming to the streaming client. The operations are performed without receiving any quality feedback from the streaming client and without measuring bandwidth of the network channel.

17 Claims, 6 Drawing Sheets

(56) References Cited

OTHER PUBLICATIONS

"Scalable Video Coding", Retrieved From: https://en.wikipedia.org/wiki/Scalable_Video_Coding, Jul. 4, 2021, 5 Pages.
Liu, et al., "Improve Encoding Efficiency and Video Quality with Adaptive LTR", Retrieved From: https://www.intel.com/content/www/us/en/developer/articles/technical/improve-encoding-efficiency-and-video-quality-with-adaptive-ltr.html, Feb. 22, 2018, 7 Pages.
"Applicant Initiated Interview Summary Issued in U.S. Appl. No. 17/670,148", dated Oct. 31, 2022, 3 Pages.
"Non Final Office Action Issued in U.S. Appl. No. 17/670,148", dated Sep. 29, 2022, 13 Pages.

* cited by examiner

SOFTWARE 580 IMPLEMENTING DESCRIBED TECHNOLOGIES

SENDER BASED ADAPTIVE BIT RATE CONTROL

BACKGROUND

Media streaming solutions for media content use lossless network protocols for media delivery over the network. Common media streaming solutions include HTTP live streaming (HLS) and dynamic adaptive streaming over HTTP (DASH). Such media streaming solutions typically deliver the media content as files. The dependency on lossless protocols and the usage of files for delivery of the media content results in latency that is high or very high depending on the underlying conditions (e.g., network conditions). For example, if the network experiences a burst loss of a few seconds, then the streaming clients will lag behind a real-time media stream by a corresponding amount. Furthermore, head-of-line blocking and TCP congestion control algorithms can increase latency in networks that are experiencing problems, such as congestion or lost network packets.

With typical adaptive bit rate streaming techniques, the streaming client decides which bit rate stream to request based on the current conditions (e.g., network conditions) at the client. For example, if the client determines that network throughput is greater than the current bit rate stream it is receiving, then the client can send feedback to the server to request a higher bit rate stream. However, such typical solutions suffer from increased latency and can be inefficient when streaming to a large number of streaming clients.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for low-latency streaming of media content. For example, sender-based adaptive bit rate control operations can be performed for each of a plurality of streaming clients, comprising streaming a media stream with a first bit rate, comprising encoded video data, to the streaming client. The operations can further comprise monitoring an outgoing queue of buffered streaming content to be sent to the streaming client. The operations can further comprise, when a step down condition is satisfied, based at least in part on the monitoring, switching to a lower bit rate media stream for streaming to the streaming client. The operations can further comprise, when a step up condition is satisfied, based at least in part on the monitoring, switching to a higher bit rate media stream for streaming to the streaming client. The sender-based adaptive bit rate control operations are performed for the plurality of streaming clients without receiving any quality feedback from the plurality of streaming clients and without measuring bandwidth of network channels used for streaming to the plurality of streaming clients.

As another example, sender-based adaptive bit rate control operations are performed for each of a plurality of streaming clients. The operations comprise, while in a monitoring state: streaming a media stream with a first bit rate, comprising encoded video data, to the streaming client, monitoring an outgoing queue of buffered streaming content to be sent to the streaming client, when a step down condition is satisfied, based at least in part on the monitoring, transitioning to a step down state that switches to a lower bit rate media stream for streaming to the streaming client, and when a step up condition is satisfied, based at least in part on the monitoring, transitioning to a step up state that switches to a higher bit rate media stream for streaming to the streaming client. The operations further comprise, while in the step down state: remaining in the step down state for a step down freeze interval, during which bit rate changes are not made, and upon expiration of the step down freeze interval, transitioning to the monitoring state. The operations further comprise, while in the step up state: when a revert step up condition is satisfied, based at least in part on monitoring of the outgoing queue of buffered streaming content, transitioning to a revert step up state that reverts to the first bit rate, and when the revert step condition is not satisfied, and upon expiration of a step up freeze interval during which bit rate changes are not made, transitioning to the monitoring state. The sender-based adaptive bit rate control operations are performed for the plurality of streaming clients without receiving any quality feedback from the plurality of streaming clients and without measuring bandwidth of network channels used for streaming to the plurality of streaming clients.

DETAILED DESCRIPTION

Overview

The following description is directed to technologies for low-latency streaming of media content (e.g., using a lossless protocol). For example, sender-based adaptive bit rate control operations can be performed for each of a plurality of streaming clients. The operations can include streaming a media stream with a first bit rate, comprising encoded video data, to the streaming client. While streaming the media stream, an outgoing queue of buffered streaming content to be sent to the streaming client can be monitored. When a step down condition is satisfied, based at least in part on the monitoring, a switch can be made to a lower bit rate media stream for streaming to the streaming client. When a step up condition is satisfied, based at least in part on the monitoring, a switch can be made to a higher bit rate media stream for streaming to the streaming client. The sender-based adaptive bit rate control operations are performed for the plurality of streaming clients without receiving any quality feedback from the plurality of streaming clients and without measuring bandwidth of network channels used for streaming to the plurality of streaming clients.

In typical streaming solutions, the streaming protocol relies on the clients to compute the available bandwidth based on the speed at which the file segments are downloaded. Based on this information, the clients detect available bandwidth and request quality changes (i.e., bit rate changes) from the sender (e.g., a server or service that is sending the media stream to the clients). This approach takes a significant amount of time because the client needs to compute bandwidth, detect changes, and send requests to the sender. As a result, the longer the underlying network is overutilized or congested, the higher the impact on latency and user experience.

Furthermore, with typical streaming solutions, it may be difficult or impossible to measure network bandwidth by observing the data stream because the data is sent to the network at the rate it is produced. Therefore, the rate at which it is received does not necessarily indicate the available bandwidth. If the data were sent at a higher rate the network might (or might not) support the higher rate.

The technologies described herein provide various advantages for streaming of media content (e.g., for low-latency streaming of media content). In general, the technologies provide sender-based solutions (also referred to as sender-side solutions) that efficiently detect when congestion is occurring in a network channel and react by lowering the bit rate (e.g., by switching to a lower bit rate stream). Conversely, when network congestion is not detected in the network channel, the technologies periodically test whether the bit rate can be raised (e.g., by switching to a higher bit rate stream). The technologies described herein detect when congestion is occurring, or likely to occur, by monitoring the outgoing queue of buffered streaming content (e.g., by only monitoring the outgoing queue of buffered streaming content).

The sender-based solutions provide this automatic bit rate control without receiving any quality feedback from the streaming clients and without measuring bandwidth of network channels used for streaming to the streaming clients. As a result of these sender-based solutions, streaming is provided in a more efficient way and with reduced latency.

These solutions provide reduced latency streaming because the sender (e.g., the streaming service) does not need to wait for feedback from the streaming client when automatically adjusting the bit rate. For example, the sender can detect congestion in the network channel based only on the outgoing queue at the sender (e.g., by measuring its fullness) and quickly step down to a lower bit rate without having to wait for a streaming client to detect a problem and communicate with the sender.

These solutions increase efficiency of streaming because the sender (e.g., the streaming service) can make bit rate decisions for many streaming clients based only on the outgoing queues and without receiving any quality feedback from the streaming clients. For example, network and computing resources are saved because quality feedback from the streaming clients is not received or processed by the sender.

These solutions allow the sender (e.g., the streaming service) to automatically select the highest bit rate stream that fits within the available bandwidth. For example, the sender reduces the bit rate when the outgoing queue indicates congestion and attempts to increase the bit rate (e.g., on a periodic basis) when the outgoing queue indicates there is no congestion. In this way, the sender can automatically transition between states where the outgoing queue is monitored and step up and step down operations are performed based, at least in part, on fullness of the outgoing queue.

These solutions allow the sender (e.g., the streaming service) to minimize playback stalls. Playback stalls are minimized by quickly and efficiently detecting congestion and switching (e.g., immediately switching) to a lower bit rate stream. Similarly, when an attempt is made to increase the bit rate, congestion can be detected quickly and the bit rate increase can be reverted (e.g., by immediately switching back).

These solutions also allow manual control of the bit rate. For example, the client can decide to move to a manual control mode where the client selects the bit rate, and the sender uses the selected bit rate without performing any adaptive rate control. The client can later switch back to the sender-side adaptive rate control solutions if desired.

The technologies described herein can be used to efficiently (e.g., with low overhead) stream audio and/or video content to streaming clients with low latency. The technologies described herein can be used with both file-based streaming protocols, such as HLS, and with ultra-low latency protocols as long as the protocol uses an outgoing queue for each of the streaming clients.

The technologies described herein can also be applied to semi-lossless protocols (also referred to as semi-lossy and/or lossy) by using loss rate reports from the client or packet resend requests from the client (NACK) or similar feedback that provides sender insight into underlying conditions between the sender and client.

The technologies described herein for streaming media content using sender-based adaptive bit rate control can be integrated with other technologies for low-latency streaming of media content, such as the technologies described in U.S. patent application Ser. No. 17/670,148, titled "ULTRA-LOW LATENCY VIDEO STREAMING," filed Feb. 11, 2022, which is incorporated herein by reference.

Terminology

The term "media content" refers to encoded audio and/or video content. The encoded audio and/or video content contains a sequence of encoded audio and/or video frames (e.g., comprising corresponding audio and/or video samples). The encoded audio and/or video frames are encoded via a corresponding audio and/or video codec.

The term "streaming" refers to transmitting media content, as a media stream, from a first computing device to a second computing device via a computer network. For example, the media stream can be streamed from a streaming service to one or more streaming clients via one or more respective network channels.

The term "lossless protocol" refers to one or more network protocols that provide for reliable transmission of data over a computer network from a first computing device (e.g., a server) to a second computing device (e.g., a client). When data fails to reach the destination computing device, the lossless protocol retransmits the data until it is successfully received (thus providing reliable transmission). Examples of lossless protocols include transmission control protocol (TCP), hypertext transfer protocol (HTTP), HTTP live streaming (HLS), and dynamic adaptive streaming over HTTP (DASH). In some implementations, a lossless transport protocols, such as TCP, is used to ensure reliable transmission of data to the client. However, in other implementations, a lossy protocol, such as user datagram protocol (UDP), can be used while a higher level protocol provides for reliable delivery of the overall network channel between the sender and client.

The term "semi-lossless protocol" refers to one or more network protocols that provide semi-reliable transmission of data over a computer network from a first computing device (e.g., a server) to a second computing device (e.g., a client). Semi-lossless protocols can provide different levels of reliability (e.g., different delivery modes).

The term "streaming client" refers to a client that receives streaming audio and/or video data. For example, a streaming client can be a software application running on a computing device (e.g., laptop or desktop computer, tablet, smart phone, or another type of computing device) that decodes and presents (e.g., via audio and/or video playback) the received media stream.

The term "sender" refers to software and/or hardware solutions that send (transmit) streaming audio and/or video data to one or more streaming clients. The sender could be a server or streaming service that sends streaming audio and/or video data to one or more streaming clients (e.g., that streams to a plurality of streaming clients). The sender could also be another type of computing device and/or software solution (e.g., a desktop, laptop, smart phone, or another type of computing device running software that streams audio and/or video data to one or more streaming clients).

The term "sender-based" (sender-side) adaptive bit rate control refers to operations performed by the sender of the media stream (e.g., by a server or service that is sending the media stream to the clients). The sender-based operations are distinct from the operations performed by the streaming clients, which are the receivers of the media stream.

Example Media Streams and Outgoing Queues

In the technologies described herein, media content is delivered to clients as a media stream (e.g., as a real-time media stream or as another type of media stream). For example, the media content of the media stream is available for delivery to the clients in real-time. Due to the various network conditions that exist between the sender and the clients, an outgoing queue is maintained for each streaming client.

Each client (also referred to as a streaming client) has an associated outgoing queue of buffered streaming content to be sent to the streaming client. For a given streaming client, the outgoing queue of buffered streaming content contains streaming content that is ready to be delivered to the given streaming client or that has been sent to the given streaming client but has not yet been confirmed as received by the given streaming client. In some implementations, the outgoing queue of buffered streaming content stores buffers that are scheduled to be sent to the streaming client, but are not yet indicated as sent. In some implementations, the outgoing queues of buffered streaming content are monitored (e.g., to determine how full they are or how many of the available buffers are occupied) using an application programming interface (API) call or a system call. The specific call depends on the operating system and/or application being used. For example, the Windows® input/output completion port (IOCP) API can be used when using the Windows operating system and the Linux io_uring system call can be used when using a Linux® operating system.

The fullness of an outgoing queue of buffered streaming content refers to how much of the queue is available to add streaming content in relation to how much of the queue is currently storing buffered streaming content to be sent to a streaming client. The fullness measure can indicate that a specific percentage of the outgoing queue is currently occupied (e.g., in terms of overall space of the queue, available buffers, or some other measure). For example, if a given outgoing queue has 100 buffers, and 40 of the buffers contain buffered streaming content (and the remaining 60 are empty), then the given outgoing queue would be 40% full.

Environments for Sender-Based Adaptive Bit Rate Control

Figure 1:
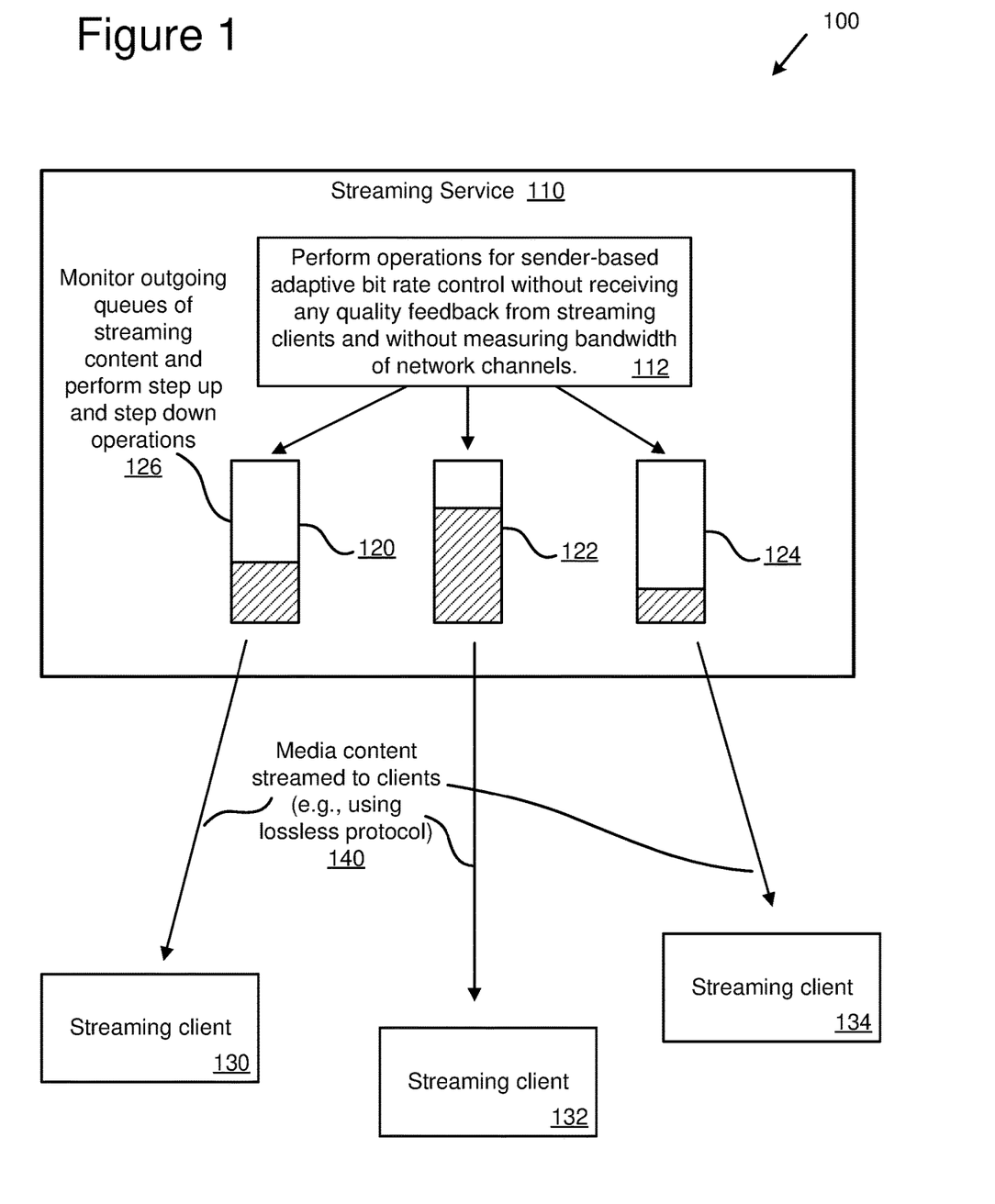
FIG. 1 is a block diagram depicting an example environment for low-latency streaming of media content, including performing sender-based adaptive bit rate control.

FIG. 1 is a diagram depicting example environment 100 for low-latency streaming of media content (e.g., using a lossless protocol), including performing sender-based adaptive bit rate control. The example environment 100 includes a streaming service 110. The streaming service 110 provides media content for streaming to streaming clients, including streaming clients 130, 132, and 134. In some implementations, the streaming service 110 uses a lossless protocol to stream media content to the streaming clients, including streaming clients 130, 132, and 134. The streaming service 110 can be implemented using various types of software and/or hardware computing resources, such as server computers, cloud computing resources, audio and/or video coding software, streaming software, etc. While the streaming service 110 is one example of a solution for performing the sender-based adaptive bit rate control technologies described herein, other types of senders (e.g., other software and/or hardware solutions) can perform the operations described regarding the streaming service 110.

The streaming service 110 performs various operations for streaming a media stream to streaming clients, as depicted at 112. For example, the operations can comprise sender-based adaptive bit rate control operations in which bit rates are automatically adjusted by streaming service 110 without receiving any quality feedback from the streaming clients (e.g., from streaming clients 130, 132, and 134) and without measuring bandwidth of the network channels that are being used to stream media content to the streaming clients.

In this example, the streaming service 110 is providing a media stream to three streaming clients, streaming client 130, streaming client 132, and streaming client 134, as depicted at 140. The streaming service 110 maintains an outgoing queue of buffered streaming content for each streaming client. Specifically, streaming client 130 is associated with queue 120, streaming client 132 is associated with queue 122, and streaming client 134 is associated with queue 124. Each queue indicates the encoded audio and/or video data waiting to be delivered to its respective streaming client. The example environment 100 depicts three streaming clients and their respective queues for ease of illustration. However, the example environment 100 supports any number of streaming clients and associated queues.

As depicted, each of the queues stores some amount of streaming content to be delivered to the streaming clients. For example, queue 120 currently contains an amount of streaming client represented by the hashed portion that is waiting to be delivered to streaming client 130. As illustrated by the hashed portion, queue 120 is not very full (e.g., 30% full). On the other hand, queue 122 is nearly full (e.g., 80% full).

The streaming service 110 can perform adaptive bit rate control operations by monitoring the queues (e.g., by monitoring queues 120, 122, and 124). For example, the streaming service 110 can monitor how full each of the queues are and lower or raise the bit rate accordingly. In some implementations, the streaming service 110 performs a step down operation to lower the bit rate when a step down condition is satisfied, and performs a step up operation to raise the bit rate when a step up condition is satisfied.

The streaming service 110 operates without using per-client quality feedback from the streaming clients (e.g., from streaming clients 130, 132, and 134). For example, when the streaming service 110 performs adaptive bit rate control operations, the streaming service 110 does so without using quality feedback from the streaming clients (e.g., the streaming clients do not send any information to the streaming service indicating that the streaming clients are experiencing network loss, delay, or congestion). In some implementations, the streaming service 110 uses only information about the queues when determining whether to adjust bit rate.

Sender-Based Adaptive Bit Rate Control using State Transitions

Figure 2:
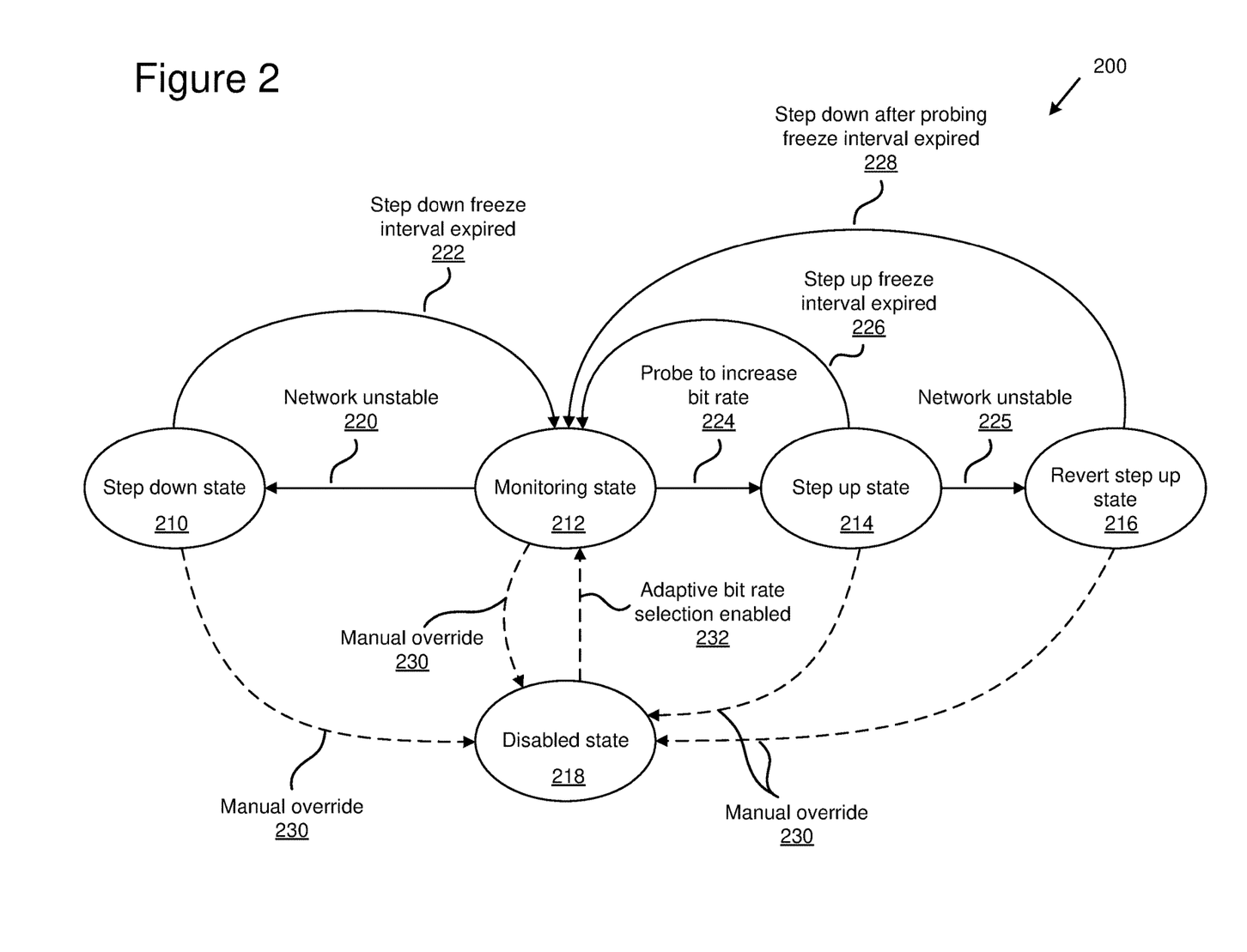
FIG. 2 an example state diagram for performing sender-based adaptive bit rate control operations.

FIG. 2 is an example state diagram 200 for performing sender-based adaptive bit rate control operations (e.g., using a lossless protocol). For example, a streaming service (e.g., streaming service 110) can perform sender-based adaptive bit rate control, for each of a plurality of streaming clients, by transitioning between the states depicted in the example state diagram 200.

The example state diagram 200 is used when monitoring outgoing queues of buffered streaming content for sending to streaming clients. In some implementations, monitoring is performed prior to sending each frame or packet to the outgoing queue, and state transitions can occur at this frequency. Other implementations can monitor the queues on another periodic basis (e.g., based on the number of frames, amount of streaming content, or amount of time).

The example state diagram 200 includes a monitoring state 212. The monitoring state 212 is the starting state and the state to which the monitoring returns when sender-based adaptive bit rate control is disabled and re-enabled. From the monitoring state 212, bit rate for a given streaming client can be increased (e.g., by switching to a higher bit rate stream) or lowered (e.g., by switching to a lower bit rate stream) based on monitoring of the outgoing queue of buffered streaming content for the given client.

While in the monitoring state 212, the streaming service monitors the condition of the queues of buffered streaming content. When a step down condition is satisfied during monitoring of a given queue and the bit rate is not at the lowest bit rate, the streaming service switches to a lower bit rate media stream for streaming to the streaming client associated with the given queue by transitioning to the step down state 210. The step down condition is determined, at least in part, by checking whether the network connection between the streaming service and the streaming client is unstable, and if so performing the transition to the step down state 210, as depicted at 220. In some implementations, the step down condition is satisfied when fullness of the outgoing queue of buffered streaming content is above a threshold value (e.g., when the queue is more than 50% full or more than 50% of the available buffers in the queue are occupied) which indicates an unstable network condition (e.g., that the network channel is congested or likely to become congested).

In some implementations, determining whether a step down condition is satisfied for a given streaming client is based only on the monitoring of the outgoing queue of streaming content for the given streaming client (e.g., performed by monitoring state 212). In this way, the streaming service can efficiently perform adaptive bit rate control without receiving any quality feedback from the streaming clients and without measuring bandwidth of the network channels. This also allows the streaming service to efficiently scale to many streaming clients while maintaining ultra-low latency.

While in the step down state 210, the streaming service waits for a period of time for the network congestion to resolve and for the network to stabilize. The period of time is referred to as the "step down freeze interval." During the period of time while in the step down state 210, bit rate switching is not performed (i.e., the streaming service will not increase or decrease the bit rate during this period of time even if network instability is detected). After the step down freeze interval has expired, as depicted at 222, the streaming service transitions back to the monitoring state 212, where switching of bit rate can now occur.

While in the monitoring state 212, the streaming service monitors the condition of the queues of buffered streaming content. When a step up condition is satisfied during monitoring of a given queue and the bit rate is not at the highest bit rate, the streaming service switches to a higher bit rate media stream for streaming to the streaming client associated with the given queue by transitioning to the step up state 214. In some implementations, the step up condition is satisfied when at least two criteria are met. First is that fullness of the outgoing queue of buffered streaming content is below a threshold value (indicating that the network is stable). Second is that a probing interval has been reached. The probing interval is designed so that the monitoring service tries to increase the bit rate on a periodic basis.

In some implementations, determining whether a step up condition is satisfied for a given streaming client is based only on the monitoring of the outgoing queue of streaming content for the given streaming client (e.g., performed by monitoring state 212). In this way, the streaming service can efficiently perform adaptive bit rate control without receiving any quality feedback from the streaming clients and without measuring bandwidth of the network channels. This also allows the streaming service to efficiently scale to many streaming clients while maintaining ultra-low latency.

When the step up condition has been satisfied while in the monitoring state 212, the streaming service tries increasing the bit rate, as depicted at 224, and transitions to the step up state 214. The step up state 214 is a transition state that the streaming service enters when probing to determine whether the higher bit rate will be supported by the network. While in the step up state 214, the condition of the outgoing queue of buffered streaming content is monitored, and there are two possible transitions. First, if network instability is detected (e.g., if fullness of the queue is above a threshold value), then the streaming service transitions (e.g., immediately transitions) to the revert step up state 216, as depicted at 225. This procedure allows the streaming service to probe the condition of the network connection to the streaming client and try a higher bit rate stream, but if instability is detected after the switch (e.g., immediately after the switch), then the bit rate can be reverted using the revert step up state 216. If the revert step up state 216 is entered, the monitoring service waits for a period of time for the network congestion to resolve and for the network to stabilize. The period of time is referred to as the "step down after probing freeze interval." During the period of time while in the revert step up state 216, bit rate switching is not performed (i.e., the streaming service will not increase or decrease the bit rate during this period of time even if network instability is detected). After the step down after probing freeze interval has expired, as depicted at 228, the streaming service transitions back to the monitoring state 212, where switching of bit rate can now occur.

The second possible transition from the step up state 214 will occur if the network is stable (i.e., network instability is not detected from monitoring the queue) for a period of time referred to as the "step up freeze interval." During this period, no transitions will be made. However, after this period (if the network has remained stable for the step up freeze interval), the monitoring service will transition back to the monitoring state 212, as depicted at 226, where switching of bit rate can now occur.

In some implementations, the step down after probing freeze interval is chosen to be longer (e.g., substantially longer) than the step down freeze interval. The reason the step down freeze interval may be shorter is that the cause of a transition to the step down state 210 is a change to the network conditions, which may have changed significantly and require further step downs to be performed. In contrast, a transition to the revert step up state 216 is caused by a failed step up operation (a failed transition to a higher bit rate), so the network conditions are likely no worse than they were before and further step downs may be unlikely. Therefore, more time can be given for the congestion to resolve before returning to the monitoring state 212.

In the technologies described herein, determining whether a network (referring to the network connection or network channel between the streaming service and the streaming client) is stable (or unstable) is performed by monitoring the state of the outgoing queue of buffered streaming content. If the fullness of the queue is above a threshold value, then the network is considered unstable (i.e., network instability has been detected). Otherwise, the network is considered stable. In some implementations, the threshold value changes depending on previous monitoring results. For example, when the preceding monitoring result indicated a stable network, then a first threshold value is used. Otherwise, when the preceding monitoring result indicated an unstable network, then a second threshold value is used (different from the first threshold value). In some implementations, the second threshold value is lower than the first. As an example, the first threshold value could be 50% and the second threshold value could be 20% (e.g., indicating that 80% of the queue is empty). In this way, a stricter threshold can be enforced for stability when the network was previously unstable.

The technologies described herein periodically probe the network to check if the bit rate can be increased. This technique is used because the bandwidth of the network channel is not, or cannot be, measured. The periodic probing technique can also provide a more accurate indication of whether the network can support a higher bit rate, regardless of what a direct measurement of bandwidth might indicate.

In some implementations, the probing interval increases as failed step up operations occur. Increasing the probing interval in this way reduces the likelihood of video stalls being experienced by the streaming client. For example, if the streaming service tries to increase the bit rate, but fails (e.g., by detecting network instability and transitioning to the revert step up state 216), then the streaming service increases the probing interval (e.g., exponentially) so that the streaming service waits for a longer period of time before probing the network again to determine if it will support a higher bit rate. In some implementations, the probing interval is controlled by the following equation:

$$\text{Probing Interval} = \text{check interval} * 2^{\min(\text{failed checks}, \text{failed checks ceiling})} \quad \text{(Equation 1)}$$

The "check interval" is a multiplier for the probing interval, and can be a predetermined or user configurable setting. As an example, the check interval could be 30 seconds. The "failed checks" count begins at zero and is incremented upon each failed step up operation. The "failed checks ceiling" value imposes a ceiling on the probing interval. To illustrate a probing interval calculation, if the check interval is 30 seconds, the failed checks count is 3 (indicating three previously failed step up operations), and the failed checks ceiling is 8, then the probing interval would be 240 seconds. In some implementations, the probing interval is reset (by resetting the failed checks count to zero) when the media stream has been playing successfully with no failed step up operations for a period of time referred to as the failed checks reset interval.

In some implementations, adaptive bit rate control by the streaming service is disabled. For example, the streaming client could send a message to the streaming service to disable monitoring and automatic bit rate selection. This option is indicated by the manual override 230 transition. When disabled, the streaming service enters a disabled state 218 where automatic bit rate selection is disabled. In this state, the streaming service can use a manually selected bit rate (e.g., as selected by the streaming client). If a decision is made to return to adaptive bit rate selection, the monitoring service transitions back to the monitoring state 212, as depicted at 232.

In some implementations, when a switch is made to a different bit rate, the switch does not occur immediately. Instead, the switch occurs on the next key video frame (e.g., I frame, IDR frame, or another type of key or independent video frame). In some implementations, when a switch is made to a different bit rate, streaming is paused until the next key video frame. This technique may be useful when congestion is detected and the streaming service is stepping down, and not sending any video frames (or any streaming content at all) until the next key video frame can help alleviate the congestion.

The following table, Table 1, lists various parameters described herein. These parameters are associated with example default values. However, depending on the implementation, different default values can be used.

TABLE 1

Example Parameters

| Parameter | Description | Example default value |
|---|---|---|
| Step down freeze interval | Interval spent in the step down state before returning to monitoring state | 3 seconds |
| Step down after probing freeze interval | Interval spent in reverting step up state | 10 seconds |
| Step up freeze interval | Interval spent in step up state | 15 seconds |
| Check interval | A multiplier for probing to switch to a higher bit rate | 30 seconds |
| Failed checks reset interval | Interval of successful playback after which the failed checks count for the stream is reset | 60 seconds |
| Failed checks ceiling | Ceiling for the number of failed checks | 8 |

In some implementations, the sender-based adaptive bit rate control operations (e.g., performed by a streaming service, such as streaming service 110) are performed for the plurality of streaming clients based only on sender-side monitoring of the outgoing queues of buffered streaming content. For example, the streaming service uses a stage diagram, such as example state diagram 200, to perform adaptive bit rate control and manage transitions between states (including a monitoring state, a step down state, a step up state, a revert step up state, a disabled state, and/or other states that can be used to perform adaptive bit rate control). In this way, the streaming service can efficiently perform adaptive bit rate control without receiving any quality feedback from the streaming clients and without measuring bandwidth of the network channels. This also allows the streaming service to efficiently scale to many streaming clients while maintaining ultra-low latency.

Methods for Sender-Based Adaptive Bit Rate Control

In any of the examples herein, methods can be provided for low-latency streaming of media content (e.g., using a lossless protocol) by performing sender-based adaptive bit rate control operations. Sender-based adaptive bit rate control can be performed by monitoring outgoing queues of buffered streaming content, and performing bit rate control operations (e.g., increasing or decreasing the bit rate) based on results of the monitoring.

Figure 3:
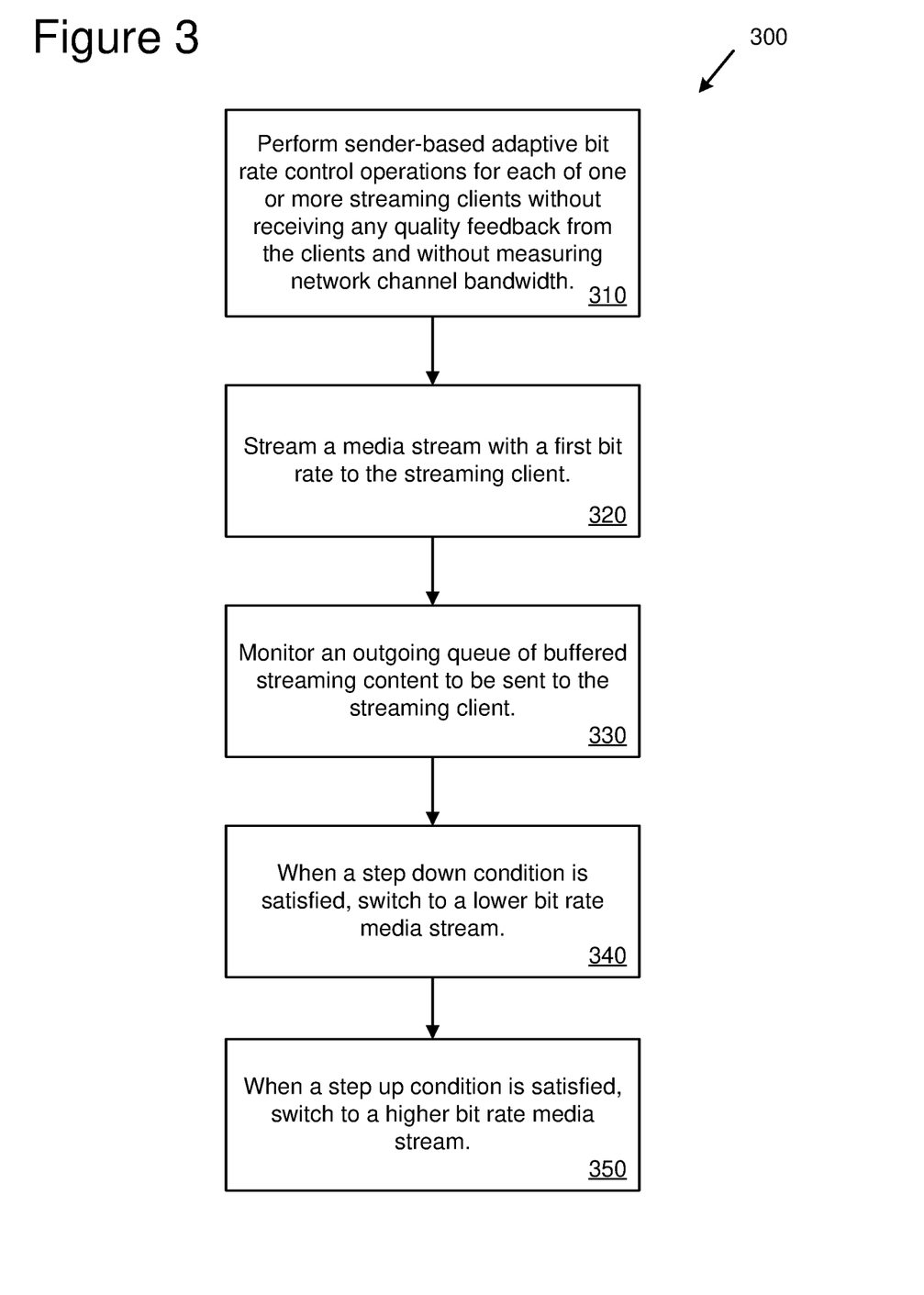
FIG. 3 is a flowchart of an example method for low-latency streaming of media content, including performing sender-based adaptive bit rate control operations.

FIG. 3 is a is a flowchart of an example method 300 for low-latency streaming of media content (e.g., using a lossless protocol). For example, the example method 300 can be performed by a streaming service, such as streaming service 110.

At 310, sender-based adaptive bit rate control operations are performed for each of one or more streaming clients. In some implementations, the sender-based adaptive bit rate control operations include the operations 320-350. Furthermore, the sender-based adaptive bit rate control operations are performed for the streaming clients without receiving any quality feedback from the streaming clients and without measuring bandwidth of network channels used for streaming to the streaming clients.

At 320, a media stream with a first bit rate is streamed to the streaming client. The media stream comprises encoded video content. The media stream is streamed to the streaming client via a network channel (e.g., a network channel between the streaming service and the streaming client).

At 330, an outgoing queue of buffered streaming content to be sent to the streaming client is monitored. The monitoring can comprise evaluating the fullness of the queue (e.g., based on a percentage of the queue that is full or empty, based on a percentage of allocated buffers that are utilized or not utilized, and/or based on other criteria indicating how full or empty the queue is).

At 340, when a step down condition associated with the outgoing queue of buffered streaming content is satisfied, a switch is performed to a lower bit rate media stream for streaming to the streaming client. The lower bit rate media stream has a lower bit rate relative to the first bit rate (e.g., the first bit rate could be 2000 kbps and the lower bit rate could be 1200 kbps). The step down condition is satisfied, at least in part, when fullness of the outgoing queue of buffered streaming content is above a threshold value. Other criteria may also be required for the step down condition to be satisfied, such as the current bit rate not being the lowest possible bit rate.

Figure 4:
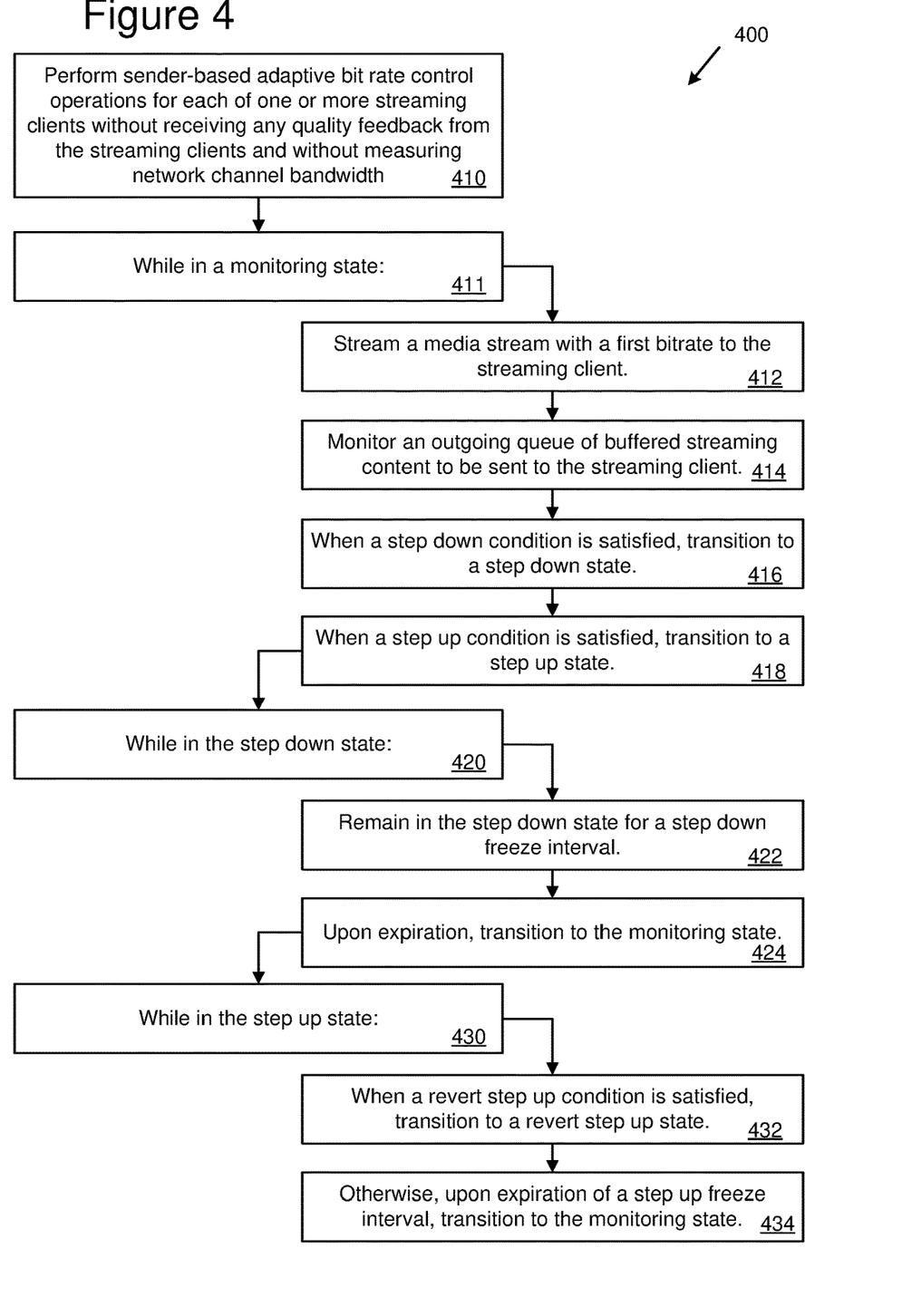
FIG. 4 is a flowchart of an example method for low-latency streaming of media content, including performing sender-based adaptive bit rate control operations to transition between states.

At 350, when a step up condition associated with the outgoing queue of buffered streaming content is satisfied, a switch is performed to a higher bit rate media stream for streaming to the streaming client. The higher bit rate media stream has a higher bit rate relative to the first bit rate. The step up condition is satisfied, at least in part, when fullness of the outgoing queue of buffered streaming content is below a threshold value and when a probing interval is reached. Other criteria may also be required for the step up condition to be satisfied, such as the current bit rate not being the highest possible bit rate FIG. 4 is a is a flowchart of an example method 400 for low-latency streaming of media content (e.g., using a lossless protocol), including performing sender-based adaptive bit rate control operations to transition between states. For example, the example method 400 can be performed by a streaming service, such as streaming service 110.

At 410, sender-based adaptive bit rate control operations (e.g., operations 411-434) are performed for each of one or more streaming clients by transitioning between states. Furthermore, the sender-based adaptive bit rate control operations are performed for the streaming clients without receiving any quality feedback from the streaming clients and without measuring bandwidth of network channels used for streaming to the streaming clients.

At 411, sender-based adaptive bit rate control operations are performed while in a monitoring state. In some implementations, the operations include operations 412-418. At 412, a media stream is streamed with a first bit rate to the streaming client (e.g., via the lossless protocol). At 414, an outgoing queue of buffered streaming content to be sent to the streaming client is monitored. At 416, when a step down condition associated with the outgoing queue of buffered streaming content is satisfied, based at least in part on the monitoring, a transition is performed to a step down state. The transition to the step down state switches to a lower bit rate media stream for streaming to the streaming client. The lower bit rate media stream has a lower bit rate relative to the first bit rate. At 418, when a step up condition associated with the outgoing queue of buffered streaming content is satisfied, based at least in part on the monitoring, a transition is performed to a step up state. The transition to the step up state switches to a higher bit rate media stream for streaming to the streaming client. The higher bit rate media stream has a higher bit rate relative to the first bit rate.

At 420, sender-based adaptive bit rate control operations are performed while in the step down state. At 422, the streaming service remains in the step down state for a step down freeze interval. During this interval, bit rate changes are not made. At 424, upon expiration of the step down freeze interval, a transition is performed back to the monitoring state at 411, where bit rate changes can now be performed based on monitoring results.

At 430, sender-based adaptive bit rate control operations are performed while in the step up state. While in the step up state the queue is monitored for instability. At 432, when a revert step up condition associated with the outgoing queue of buffered streaming content is satisfied, based at least in part on the monitoring, a transition is performed to a revert step up state that reverts (e.g., immediately reverts) to the previous bit rate (e.g., to the first bit rate). In some implementations, the revert step up condition is satisfied when monitoring of the outgoing queue of buffered streaming content indicates fullness above a threshold value (e.g., as is performed at 414). Otherwise (when the revert step up condition is not satisfied), at 434, upon expiration of a step up freeze interval, a transition is performed back to the monitoring state at 411.

Additional Examples

Example 1 is a computing device comprising: a processor, a network interface, and memory, the computing device configured to perform operations for low-latency streaming of media content, the operations comprising: performing sender-based adaptive bit rate control operations for each of a plurality of streaming clients, comprising: streaming a media stream with a first bit rate, comprising encoded video data, to the streaming client; monitoring an outgoing queue of buffered streaming content to be sent to the streaming client; when a step down condition associated with the outgoing queue of buffered streaming content is satisfied, based at least in part on the monitoring, switching to a lower bit rate media stream, relative to the first bit rate, for streaming to the streaming client; and when a step up condition associated with the outgoing queue of buffered streaming content is satisfied, based at least in part on the monitoring, switching to a higher bit rate media stream, relative to the first bit rate, for streaming to the streaming client; wherein the sender-based adaptive bit rate control operations are performed for the plurality of streaming clients without receiving any quality feedback from the plurality of streaming clients and without measuring bandwidth of network channels used for streaming to the plurality of streaming clients.

Example 2 includes the subject matter of Example 1, and further specifies that the sender-based adaptive bit rate control operations are performed for the plurality of streaming clients based only on sender-side monitoring of the outgoing queues of buffered streaming content.

Example 3 includes the subject matter of any of Examples 1-2, and further specifies that the step down condition is satisfied, at least in part, when fullness of the outgoing queue of buffered streaming content is above a threshold value.

Example 4 includes the subject matter of Example 3, and further specifies that the threshold value depends on whether a preceding monitoring result indicated network instability, and wherein the threshold value is lower when the preceding monitoring result indicated network instability.

Example 5 includes the subject matter of any of Examples 1-4, and further specifies that the operations further comprise: after switching to the lower bit rate media stream upon satisfying the step-down condition, remaining in a step down state for a period of time, wherein bit rate switching is not performed while in the step down state.

Example 6 includes the subject matter of Example 5, and further specifies that the operations further comprise: after the period of time has expired, moving to a monitoring state in which bit rate switching is permitted based on results of the monitoring.

Example 7 includes the subject matter of any of Examples 1-6, and further specifies that the step up condition is satisfied, at least in part, when fullness of the outgoing queue of buffered streaming content is below a threshold value and when a probing interval is reached.

Example 8 includes the subject matter of Example 7, and further specifies that the probing interval is a variable length of time that increases when failed step up operations occur.

Example 9 includes the subject matter of any of Examples 7-8, and further specifies that the probing interval is reset to a starting value when the media stream has been streaming without a failed step up operation for a reset period.

Example 10 includes the subject matter of any of Examples 7-9, and further specifies that the threshold value depends on whether a preceding monitoring result indicated network instability, and wherein the threshold value is lower when the preceding monitoring result indicated network instability.

Example 11 includes the subject matter of any of Examples 1-10, and further specifies that the operations further comprising: after switching to the higher bit rate media stream upon satisfying the step-up condition, remaining in a step up state until a first occurrence of: expiration of a period of time during which bit rate switching is not performed; or detection of network instability, upon which a revert step up state is entered and bit rate is reverted to the first bit rate.

Example 12 includes the subject matter of any of Examples 1-11, and further specifies that determining whether a step up condition or a step down condition is satisfied for a given streaming client is based only on the monitoring of the outgoing queue of streaming content for the given streaming client, and that the media stream is streamed to each of the plurality of streaming clients via a lossless protocol.

Example 13 is a method, implemented by a computing device, for low-latency streaming of media content, the method comprising: performing sender-based adaptive bit rate control operations for each of a plurality of streaming clients, comprising: streaming a media stream with a first bit rate, comprising encoded video data, to the streaming client; monitoring an outgoing queue of buffered streaming content to be sent to the streaming client; when a step down condition associated with the outgoing queue of buffered streaming content is satisfied, based at least in part on the monitoring, switching to a lower bit rate media stream, relative to the first bit rate, for streaming to the streaming client; and when a step up condition associated with the outgoing queue of buffered streaming content is satisfied, based at least in part on the monitoring, switching to a higher bit rate media stream, relative to the first bit rate, for streaming to the streaming client; wherein the sender-based adaptive bit rate control operations are performed for the plurality of streaming clients without receiving any quality feedback from the plurality of streaming clients and without measuring bandwidth of network channels used for streaming to the plurality of streaming clients.

Example 14 includes the subject matter of Example 13, and further specifies that the sender-based adaptive bit rate control operations are performed for the plurality of streaming clients based only on sender-side monitoring of the outgoing queues of buffered streaming content.

Example 15 includes the subject matter of any of Examples 13-14, and further specifies that the step down condition is satisfied, at least in part, when fullness of the outgoing queue of buffered streaming content is above a threshold value.

Example 16 includes the subject matter of any of Examples 13-15, and further specifies that the method further comprises: after switching to the lower bit rate media stream upon satisfying the step-down condition, remaining in a step down state for a period of time, wherein bit rate switching is not performed while in the step down state; and after the period of time has expired, moving to a monitoring state in which bit rate switching is permitted based on results of the monitoring.

Example 17 includes the subject matter of any of Examples 13-16, and further specifies that the step up condition is satisfied, at least in part, when fullness of the outgoing queue of buffered streaming content is below a threshold value and when a probing interval is reached.

Example 18 includes the subject matter of any of Examples 13-17, and further specifies that the method further comprises: after switching to the higher bit rate media stream upon satisfying the step-up condition, remaining in a step up state until a first occurrence of: expiration of a period of time during which bit rate switching is not performed; or detection of network instability, upon which a revert step up state is entered and bit rate is reverted to the first bit rate.

Example 19 is one or more computer-readable storage media storing computer-executable instructions for execution on a computing device to perform operations for low-latency streaming of media content, the operations comprising: performing sender-based adaptive bit rate control operations for each of a plurality of streaming clients, comprising: while in a monitoring state: streaming a media stream with a first bit rate, comprising encoded video data, to the streaming client; monitoring an outgoing queue of buffered streaming content to be sent to the streaming client; when a step down condition associated with the outgoing queue of buffered streaming content is satisfied, based at least in part on the monitoring, transitioning to a step down state that switches to a lower bit rate media stream, relative to the first bit rate, for streaming to the streaming client; and when a step up condition associated with the outgoing queue of buffered streaming content is satisfied, based at least in part on the monitoring, transitioning to a step up state that switches to a higher bit rate media stream, relative to the first bit rate, for streaming to the streaming client; while in the step down state: remaining in the step down state for a step down freeze interval, during which bit rate changes are not made; and upon expiration of the step down freeze interval, transitioning to the monitoring state; and while in the step up state: when a revert step up condition associated with the outgoing queue of buffered streaming content is satisfied, based at least in part on monitoring of the outgoing queue of buffered streaming content, transitioning to a revert step up state that reverts to the first bit rate; and when the revert step condition is not satisfied, and upon expiration of a step up freeze interval during which bit rate changes are not made, transitioning to the monitoring state; wherein the sender-based adaptive bit rate control operations are performed for the plurality of streaming clients without receiving any quality feedback from the plurality of streaming clients and without measuring bandwidth of network channels used for streaming to the plurality of streaming clients.

Example 20 includes the subject matter of Example 19, and further specifies that the sender-based adaptive bit rate control operations further comprise: when in the revert step up state: reverting to the first bit rate; after reverting to the first bit rate, remaining in the revert step up state for a step down after probing freeze interval during which bit rate changes are not made; and after expiration of the step down after probing freeze interval, transitioning to the monitoring state.

Computing Systems

Figure 5:
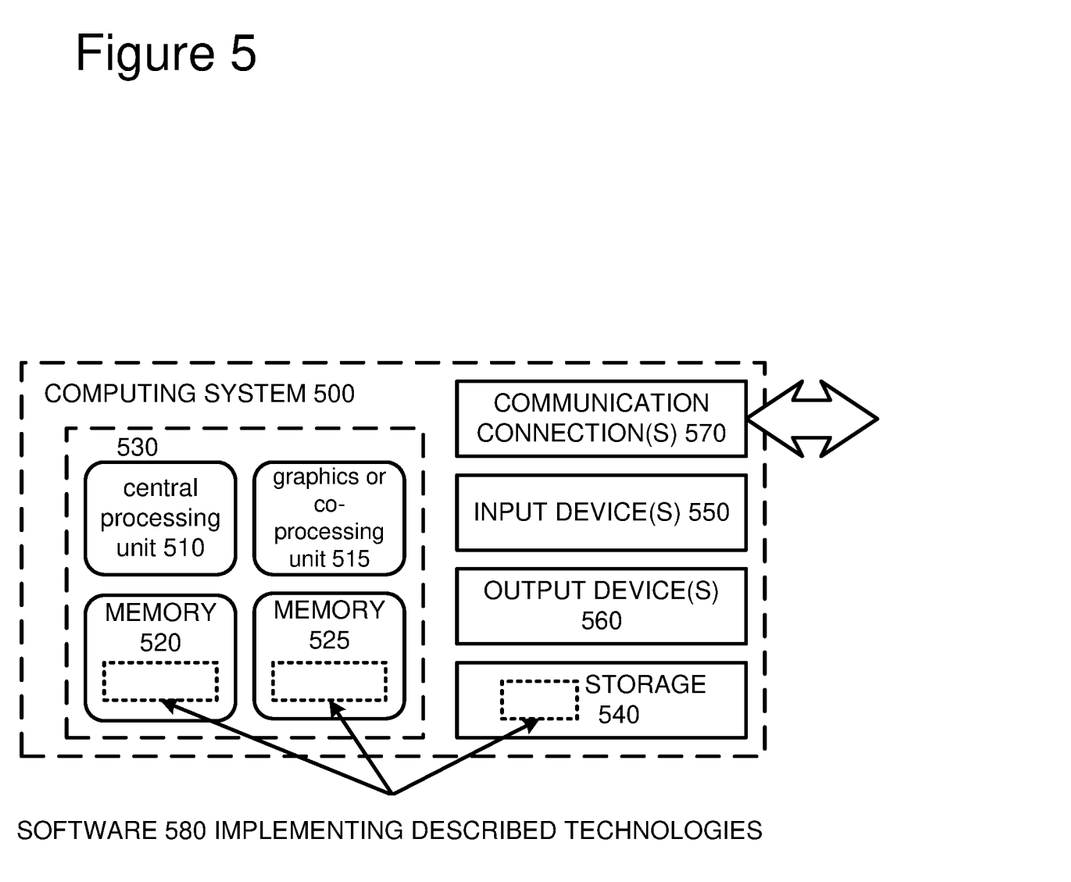
FIG. 5 is a diagram of an example computing system in which some described embodiments can be implemented.

FIG. 5 depicts a generalized example of a suitable computing system 500 in which the described technologies may be implemented. The computing system 500 is not intended to suggest any limitation as to scope of use or functionality, as the technologies may be implemented in diverse general-purpose or special-purpose computing systems.

With reference to FIG. 5, the computing system 500 includes one or more processing units 510, 515 and memory 520, 525. In FIG. 5, this basic configuration 530 is included within a dashed line. The processing units 510, 515 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 5 shows a central processing unit 510 as well as a graphics processing unit or co-processing unit 515. The tangible memory 520, 525 may be volatile memory (e.g., registers, cache, RAM), non-volatile memory (e.g., ROM, EEPROM, flash memory, etc.), or some combination of the two, accessible by the processing unit(s). The memory 520, 525 stores software 580 implementing one or more technologies described herein, in the form of computer-executable instructions suitable for execution by the processing unit(s).

A computing system may have additional features. For example, the computing system 500 includes storage 540, one or more input devices 550, one or more output devices 560, and one or more communication connections 570. An interconnection mechanism (not shown) such as a bus, controller, or network interconnects the components of the computing system 500. Typically, operating system software (not shown) provides an operating environment for other software executing in the computing system 500, and coordinates activities of the components of the computing system 500.

The tangible storage 540 may be removable or non-removable, and includes magnetic disks, magnetic tapes or cassettes, CD-ROMs, DVDs, or any other medium which can be used to store information and which can be accessed within the computing system 500. The storage 540 stores instructions for the software 580 implementing one or more technologies described herein.

The input device(s) 550 may be a touch input device such as a keyboard, mouse, pen, or trackball, a voice input device, a scanning device, or another device that provides input to the computing system 500. For video encoding, the input device(s) 550 may be a camera, video card, TV tuner card, or similar device that accepts video input in analog or digital form, or a CD-ROM or CD-RW that reads video samples into the computing system 500. The output device(s) 560 may be a display, printer, speaker, CD-writer, or another device that provides output from the computing system 500.

The communication connection(s) 570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud-Supported Environment

Figure 6:
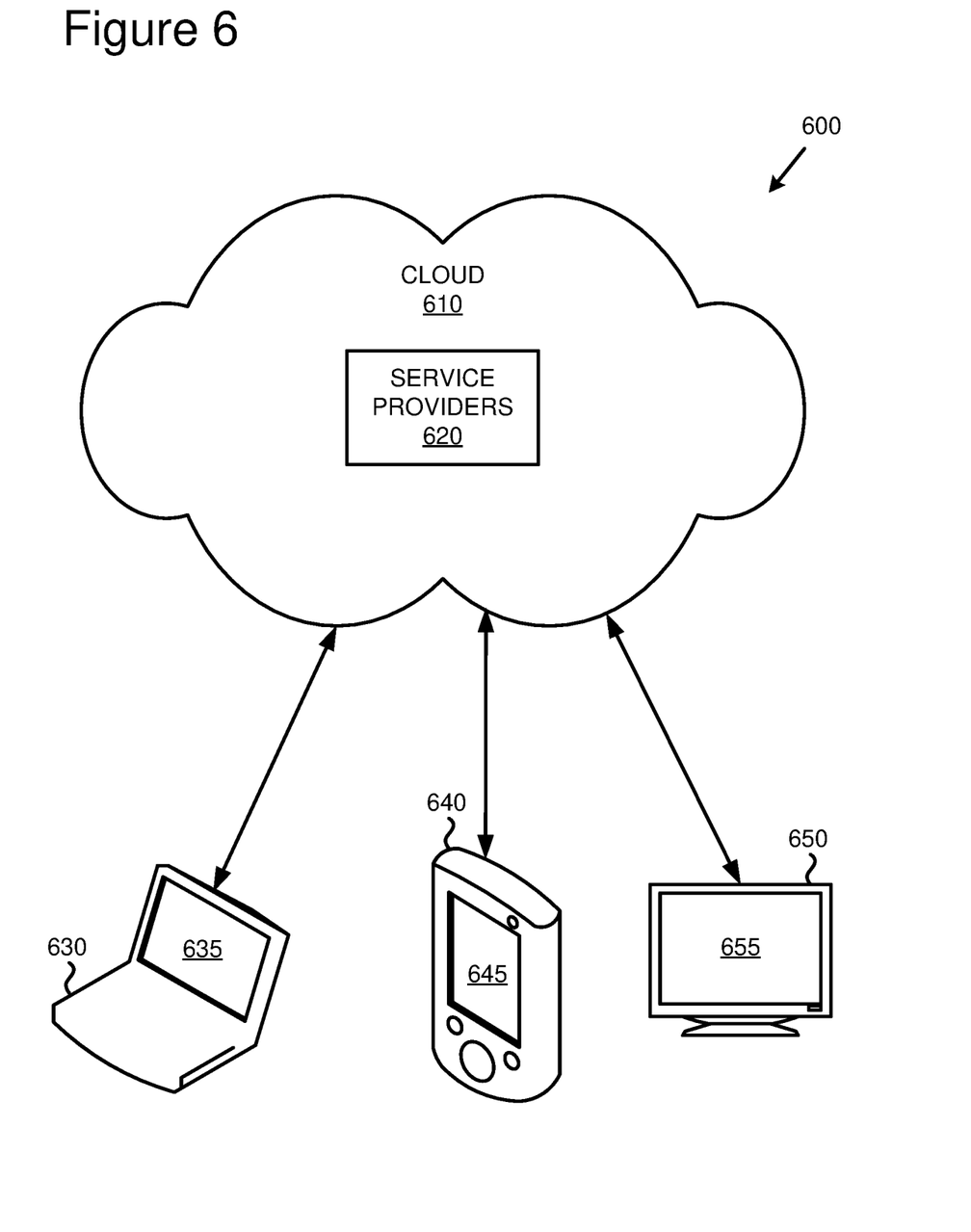
FIG. 6 is an example cloud-support environment that can be used in conjunction with the technologies described herein.

FIG. 6 illustrates a generalized example of a suitable cloud-supported environment 600 in which described embodiments, techniques, and technologies may be implemented. In the example environment 600, various types of services (e.g., computing services) are provided by a cloud 610. For example, the cloud 610 can comprise a collection of computing devices, which may be located centrally or distributed, that provide cloud-based services to various types of users and devices connected via a network such as the Internet. The implementation environment 600 can be used in different ways to accomplish computing tasks. For example, some tasks (e.g., processing user input and presenting a user interface) can be performed on local computing devices (e.g., connected devices 630, 640, 650) while other tasks (e.g., storage of data to be used in subsequent processing) can be performed in the cloud 610.

In example environment 600, the cloud 610 provides services for connected devices 630, 640, 650 with a variety of screen capabilities. Connected device 630 represents a device with a computer screen 635 (e.g., a mid-size screen). For example, connected device 630 could be a personal computer such as desktop computer, laptop, notebook, netbook, or the like. Connected device 640 represents a device with a mobile device screen 645 (e.g., a small size screen). For example, connected device 640 could be a mobile phone, smart phone, personal digital assistant, tablet computer, and the like. Connected device 650 represents a device with a large screen 655. For example, connected device 650 could be a television screen (e.g., a smart television) or another device connected to a television (e.g., a set-top box or gaming console) or the like. One or more of the connected devices 630, 640, 650 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 600. For example, the cloud 610 can provide services for one or more computers (e.g., server computers) without displays.

Services can be provided by the cloud 610 through service providers 620, or through other providers of online services (not depicted). For example, cloud services can be customized to the screen size, display capability, and/or touchscreen capability of a particular connected device (e.g., connected devices 630, 640, 650).

In example environment 600, the cloud 610 provides the technologies and solutions described herein to the various connected devices 630, 640, 650 using, at least in part, the service providers 620. For example, the service providers 620 can provide a centralized solution for various cloud-based services. The service providers 620 can manage service subscriptions for users and/or devices (e.g., for the connected devices 630, 640, 650 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 5, computer-readable storage media include memory 520 and 525, and storage 540. The term computer-readable storage media does not include signals and carrier waves. In addition, the term computer-readable storage media does not include communication connections, such as 570.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
   a processor;
   a network interface; and
   memory;
   the computing device configured to perform operations for low-latency streaming of media content, the operations comprising:
      performing sender-based adaptive bit rate control operations for each of a plurality of streaming clients, comprising:
         streaming a media stream with a first bit rate, comprising encoded video data, to a streaming client;
         monitoring an outgoing queue of buffered streaming content to be sent to the streaming client;
         when a step down condition associated with the outgoing queue of buffered streaming content is satisfied, based at least in part on the monitoring, switching to a lower bit rate media stream, relative to the first bit rate, for streaming to the streaming client; and
         when a step up condition associated with the outgoing queue of buffered streaming content is satisfied, based at least in part on the monitoring, performing a step up operation that switches to a higher bit rate media stream, relative to the first bit rate, for streaming to the streaming client, wherein the step up condition is satisfied, at least in part, when fullness of the outgoing queue of buffered streaming content is below a threshold value and when a probing interval is reached, and wherein the probing interval is a variable length of time that increases when failed step up operations occur so that a longer period of time, in relation to a preceding step up operation, is used before performing a subsequent step up operation to increase bit rate again;
      wherein the sender-based adaptive bit rate control operations are performed for the plurality of streaming clients without receiving any quality feedback from the plurality of streaming clients and without measuring bandwidth of network channels used for streaming to the plurality of streaming clients.

2. The computing device of claim 1, wherein the sender-based adaptive bit rate control operations are performed for the plurality of streaming clients based only on sender-side monitoring of the outgoing queues of buffered streaming content.

3. The computing device of claim 1, wherein the step down condition is satisfied, at least in part, when fullness of the outgoing queue of buffered streaming content is above another threshold value.

4. The computing device of claim 3, wherein the other threshold value depends on whether a preceding monitoring result indicated network instability, and wherein the threshold value is lower when the preceding monitoring result indicated network instability.

5. The computing device of claim 1, the operations further comprising:
   after switching to the lower bit rate media stream upon satisfying the step-down condition, remaining in a step down state for a period of time, wherein bit rate switching is not performed while in the step down state.

6. The computing device of claim 5, the operations further comprising:
   after the period of time has expired, moving to a monitoring state in which bit rate switching is permitted based on results of the monitoring.

7. The computing device of claim 1, wherein the probing interval is reset to a starting value when the media stream has been streaming without a failed step up operation for a reset period.

8. The computing device of claim 1, wherein the threshold value depends on whether a preceding monitoring result indicated network instability, and wherein the threshold value is lower when the preceding monitoring result indicated network instability.

9. The computing device of claim 1, the operations further comprising:
   after switching to the higher bit rate media stream upon satisfying the step-up condition, remaining in a step up state until a first occurrence of:
      expiration of a period of time during which bit rate switching is not performed; or
      detection of network instability, upon which a revert step up state is entered and bit rate is reverted to the first bit rate.

10. The computing device of claim 1, wherein determining whether a step up condition or a step down condition is satisfied for a given streaming client is based only on the monitoring of the outgoing queue of streaming content for the given streaming client, and wherein the media stream is streamed to each of the plurality of streaming clients via a lossless protocol.

11. A method, implemented by a computing device, for low-latency streaming of media content, the method comprising:
   performing sender-based adaptive bit rate control operations for each of a plurality of streaming clients, comprising:
      streaming a media stream with a first bit rate, comprising encoded video data, to a streaming client;
      monitoring an outgoing queue of buffered streaming content to be sent to the streaming client;
      when a step down condition associated with the outgoing queue of buffered streaming content is satisfied, based at least in part on the monitoring, switching to a lower bit rate media stream, relative to the first bit rate, for streaming to the streaming client; and
      when a step up condition associated with the outgoing queue of buffered streaming content is satisfied, based at least in part on the monitoring, performing a step up operation that switches to a higher bit rate media stream, relative to the first bit rate, for streaming to the streaming client, wherein the step up condition is satisfied, at least in part, when fullness of the outgoing queue of buffered streaming content is below a threshold value and when a probing interval is reached, and wherein the probing interval is a variable length of time that increases when failed step up operations occur so that a longer period of time, in relation to a preceding step up operation, is used before performing a subsequent step up operation to increase bit rate again;

wherein the sender-based adaptive bit rate control operations are performed for the plurality of streaming clients without receiving any quality feedback from the plurality of streaming clients and without measuring bandwidth of network channels used for streaming to the plurality of streaming clients.

12. The method of claim 11, wherein the sender-based adaptive bit rate control operations are performed for the plurality of streaming clients based only on sender-side monitoring of the outgoing queues of buffered streaming content.

13. The method of claim 11, wherein the step down condition is satisfied, at least in part, when fullness of the outgoing queue of buffered streaming content is above another threshold value.

14. The method of claim 11, further comprising:
after switching to the lower bit rate media stream upon satisfying the step-down condition, remaining in a step down state for a period of time, wherein bit rate switching is not performed while in the step down state; and
after the period of time has expired, moving to a monitoring state in which bit rate switching is permitted based on results of the monitoring.

15. The method of claim 11, further comprising:
after switching to the higher bit rate media stream upon satisfying the step-up condition, remaining in a step up state until a first occurrence of:
expiration of a period of time during which bit rate switching is not performed; or
detection of network instability, upon which a revert step up state is entered and bit rate is reverted to the first bit rate.

16. One or more computer-readable storage media storing computer-executable instructions for execution on a computing device to perform operations for low-latency streaming of media content, the operations comprising:
performing sender-based adaptive bit rate control operations for each of a plurality of streaming clients, comprising:
while in a monitoring state:
streaming a media stream with a first bit rate, comprising encoded video data, to the streaming client;
monitoring an outgoing queue of buffered streaming content to be sent to the streaming client;
when a step down condition associated with the outgoing queue of buffered streaming content is satisfied, based at least in part on the monitoring, transitioning to a step down state that switches to a lower bit rate media stream, relative to the first bit rate, for streaming to the streaming client; and
when a step up condition associated with the outgoing queue of buffered streaming content is satisfied, based at least in part on the monitoring, transitioning, via a step up operation, to a step up state that switches to a higher bit rate media stream, relative to the first bit rate, for streaming to the streaming client, wherein the step up condition is satisfied, at least in part, when fullness of the outgoing queue of buffered streaming content is below a threshold value and when a probing interval is reached, and wherein the probing interval is a variable length of time that increases when failed step up operations occur so that a longer period of time, in relation to a preceding step up operation, is used before performing a subsequent step up operation to increase bit rate again;
while in the step down state:
remaining in the step down state for a step down freeze interval, during which bit rate changes are not made; and
upon expiration of the step down freeze interval, transitioning to the monitoring state; and
while in the step up state:
when a revert step up condition associated with the outgoing queue of buffered streaming content is satisfied, based at least in part on monitoring of the outgoing queue of buffered streaming content, transitioning to a revert step up state that reverts to the first bit rate; and
when the revert step up condition is not satisfied, and upon expiration of a step up freeze interval during which bit rate changes are not made, transitioning to the monitoring state;
wherein the sender-based adaptive bit rate control operations are performed for the plurality of streaming clients without receiving any quality feedback from the plurality of streaming clients and without measuring bandwidth of network channels used for streaming to the plurality of streaming clients.

17. The one or more computer-readable storage media of claim 16, the sender-based adaptive bit rate control operations further comprising:
when in the revert step up state:
reverting to the first bit rate;
after reverting to the first bit rate, remaining in the revert step up state for a step down after probing freeze interval during which bit rate changes are not made; and
after expiration of the step down after probing freeze interval, transitioning to the monitoring state.

* * * * *